UNITED STATES PATENT OFFICE.

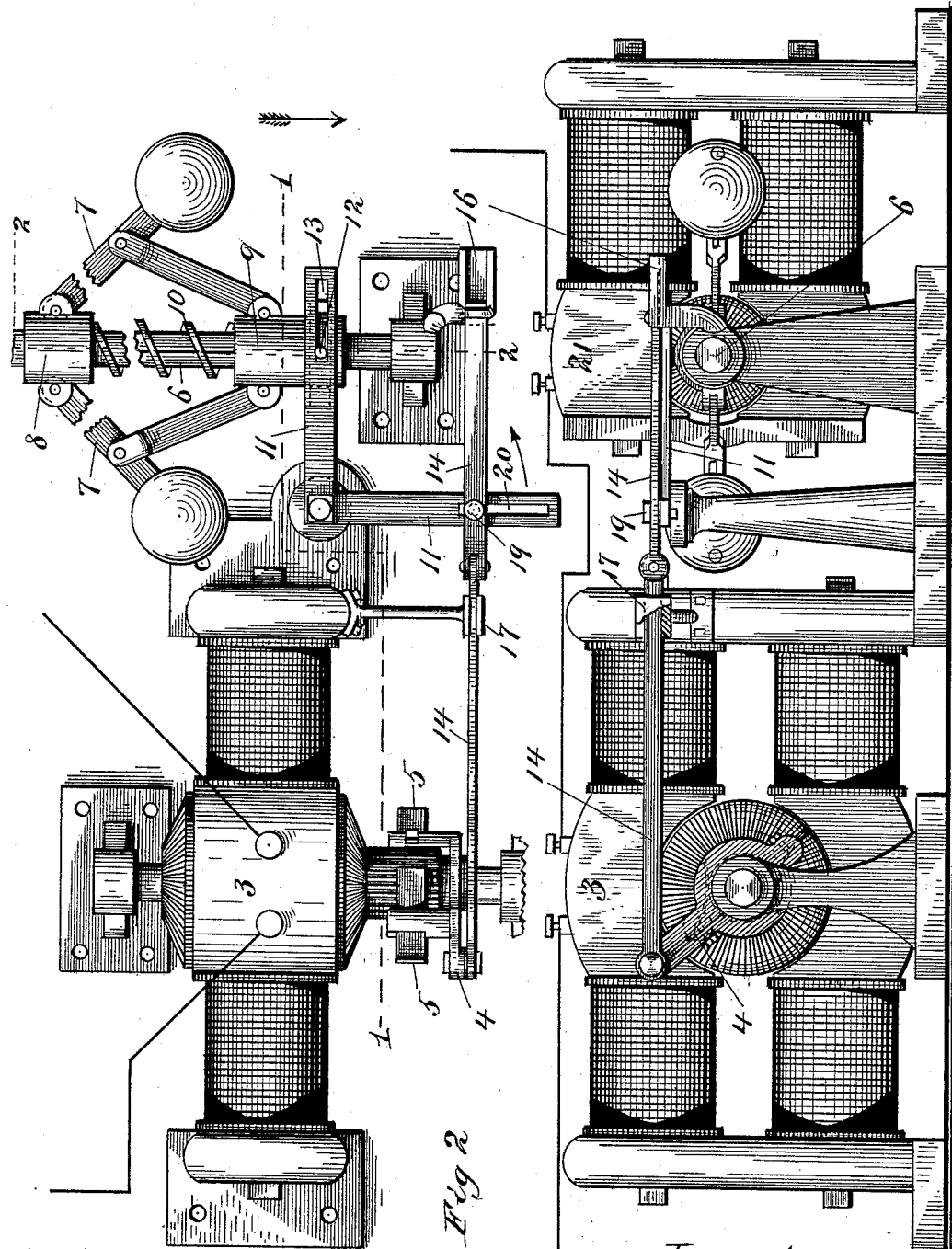

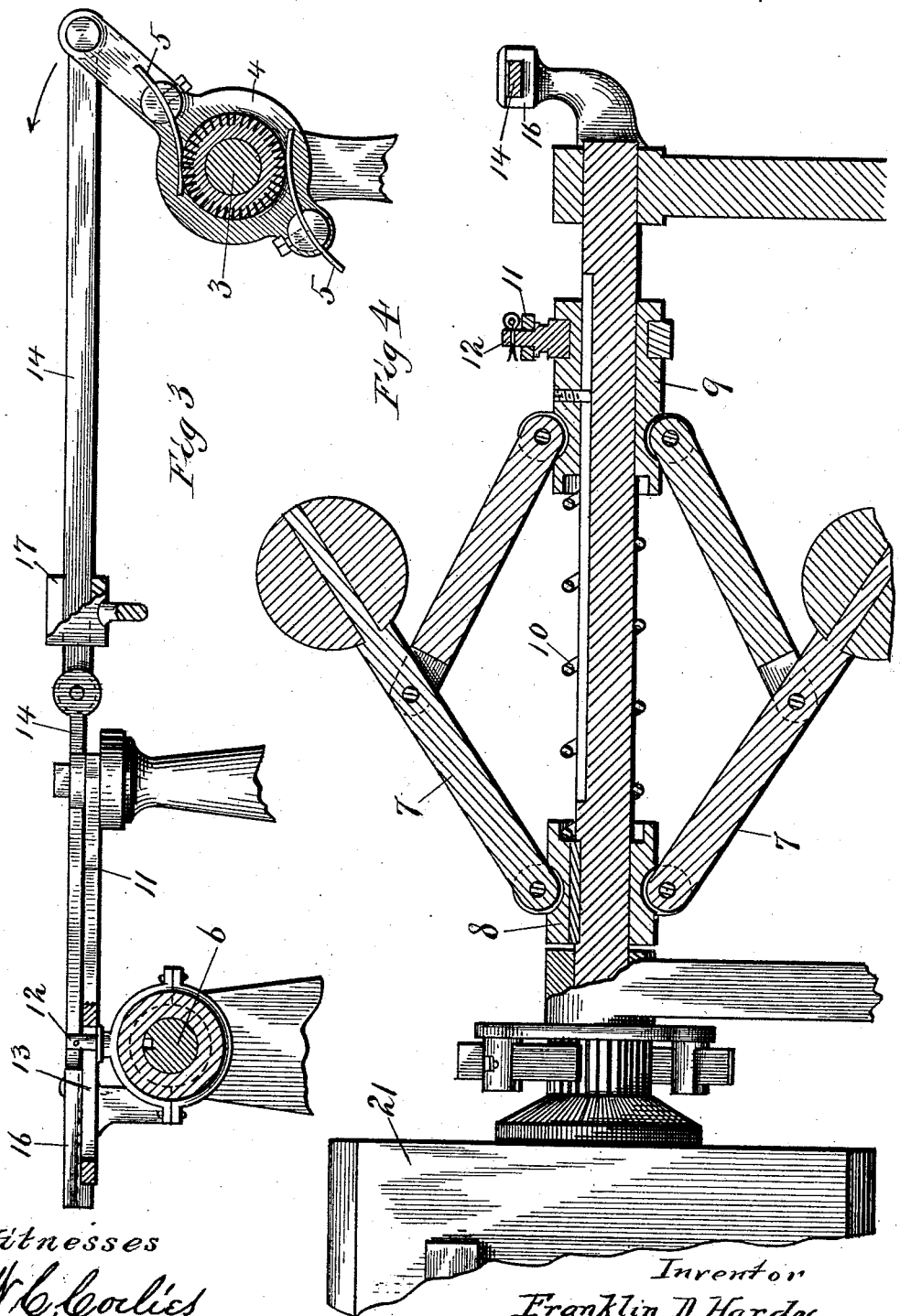

FRANKLIN D. HARDY, OF CHICAGO, ILLINOIS, ASSIGNOR OF PART TO CREWS & OWEN AND EDWIN J. BLOOD, ALL OF SAME PLACE.

ELECTRICAL GOVERNOR.

SPECIFICATION forming part of Letters Patent No. 440,590, dated November 11, 1890.

Application filed February 1, 1890. Serial No. 338,882. (No model.)

*To all whom it may concern:*

Be it known that I, FRANKLIN D. HARDY, a citizen of the United States, residing in Chicago, Cook county, Illinois, have invented a certain new and useful Electrical Governor, which is fully set forth in the following specification and illustrated in the drawings accompanying the same.

The object of my invention is to provide a means by which to regulate and control the electric current produced by a dynamo or electric generator. I accomplish such object by means of a governor actuated by a centrifugal force, being secured upon or connected with the shaft of an electric motor and mechanically connected; also, with the brush-holder of the dynamo. The motor is placed near and in electrical connection with the dynamo. Mechanical connection of the motor with the dynamo is made by means of a pitman secured at one end to the brush-holder of the dynamo and at the other to a bell-crank lever which is actuated by the governor on the motor-shaft.

It is a well-known fact that the polar and neutral lines of a dynamo are at right angles. It is also well known that if the brushes of the dynamo are applied to the commutator at the neutral line they will receive no current. If they are applied at the polar line, the tension or electro-motive force of the current will be greatest. If they are applied at any point between these lines, the current will vary according to the distance of the brushes from the respective lines. The normal position of the brushes on the commutator is at the polar line. The ideal governor, then, is one which, connected with the shaft of a motor which is in a common circuit with the dynamo and actuated by electrical force as the motor-shaft revolves, will automatically move the brushes of the dynamo from or toward the polar line as the velocity of the motor-shaft increases or decreases, thereby varying the tension of the current produced by the dynamo. It is obvious that the velocity of the motor-shaft will vary according to the electro-motive force of the current produced by the dynamo. Such a governor I claim to have invented, and it is illustrated in the accompanying drawings, in which—

Figure 1 is a plan view of certain parts of a dynamo and motor, showing the motor-shaft produced and fitted with my improved electrical governor. Fig. 2 is a side elevation of such parts, showing the electrical connection of dynamo and motor. Fig. 3 is a detail cross-section of the shafts of dynamo and motor, taken on the line 1 1 of Fig. 1, looking in the direction of the arrow, showing the connection of the pitman and the brush-holder of the dynamo. Fig. 4 is a detail longitudinal section of the motor-shaft, taken on the broken line 2 2 of Fig. 1, showing the governor in vertical position and showing the spiral spring in section and the connection of the bell-crank lever and movable collar.

Like numerals refer to like parts throughout the several views.

In the drawings, 3 is the dynamo; 4, its brush-holder; 5, its brushes; 6, the shaft produced of a motor, and 7, the governor. This is pivoted or hinged at one end to the collar 8, which is rigidly secured on the shaft 6. The other end of the governor is secured by links to the sleeve 9, which slides upon the shaft.

This governor is of the well-known construction of governors designed to be actuated by centrifugal force.

10 is a spring designed to restore the governor to normal position as the current from the dynamo becomes normal.

11 is a bell-crank lever, pivoted at its angle to a suitable support and suitably connected with the sleeve 9 and the brush-holder 4. Suitable connection with the sleeve may be by stud-pin 12, secured to the collar on the sleeve 9 and passing through the slot 13 in one arm of the lever, which slot permits the arm to describe the arc of a circle when the sleeve 9 moves. Connection with the brush-holder is made by means of the pitman 14. This is made in two sections, pivoted together by the pin 15. The pitman is supported in the guides 16 and 17 and is pivoted at one extremity (at the point 18) to the brush-holder of the dynamo. Its opposite section is provided with the pivot 19, rigidly secured in said section and passing through and sliding in the slot 20 in the other arm of the bell-crank lever, such slot being necessary to allow a rotary motion of said arm. The shaft 6 and sleeve 9 are made with groove and spline of well-known construction.

In the figures only such parts of the dynamo and motor are shown as are necessary in describing my governor and its operation.

The brushes of the dynamo are shown in their normal position on the commutator and mechanically connected with the pitman, the latter being pivoted to one arm of the bell-crank lever, the other arm of the latter being pivoted on the collar of the motor-shaft. The collar is rotatively secured on the shaft by the well-known spline-and-key device, and freely moves longitudinally on the shaft as the arms of the governor are thrown out by centrifugal force.

The governor is of the usual construction, being provided with weights at the junction of its arms and connected loosely to its movable and fixed collars. It is provided, also, with a spiral spring encircling the shaft and extending from one collar to the other, designed to return the governor toward its normal position as the velocity of the shaft decreases.

The operation and purpose of the above-described mechanism are now obvious. Let an electric motor provided with my governor be placed in the circuit of a dynamo, the proper connection of governor and brush-holder of dynamo being made by bell-crank lever and pitman. The brushes of the dynamo being in normal position, the dynamo running at its rated speed would generate a current due its capacity at such speed, thereby running the motor at a corresponding speed. Any variation in the current generated by the dynamo will cause a corresponding variation in the velocity of the motor-shaft, thus affecting the action of the governor. If the velocity increases beyond its rated degree, the arms of the governor will be thrown out, the movable sleeve will actuate the bell-crank lever, and through this the pitman, which will thus move the brushes out of the polar line. As soon as such movement begins the current proceeding from the generator will begin to grow weaker. As this proceeds the velocity of the motor-shaft will grow less, the spiral spring will tend to draw the arms of the governor together, and the normal condition of all the mechanism and the current will be restored.

What I claim as new, and desire to secure by Letters Patent of the United States, is—

1. The combination, with an electric motor, of a governor actuated by centrifugal force, a sleeve on the motor-shaft, a bell-crank lever connected thereto, and a pitman connecting the lever to the brush-holder of a dynamo, as and for the purpose stated.

2. An electrical governor, substantially as described, in combination with a bell-crank lever, a pitman, the brushes of a dynamo, and an electric motor in a common circuit with the dynamo, as and for the purpose stated.

3. In an electrical governor, the combination of a centrifugal device suitably attached to an electric motor-shaft with the brush-holder of a dynamo and the said motor placed in the circuit of the dynamo, as and for the purpose stated.

4. In an electrical governor, the combination of an electric motor provided with a revolving armature with a centrifugal device secured to the motor-shaft and suitably attached to the brush-holder of a dynamo, and the circuit-wire electrically connecting the motor with the dynamo, as and for the purpose set forth.

5. In an electrical governor, the combination of an electric motor the speed of which is variable, according to the tension or electro-motive force of the current generated by a dynamo and passing through the motor, with a governor actuated by centrifugal force and attached to the motor-shaft, the centrifugal force varying with the speed of the motor-shaft and the brush-holder of the dynamo attached to the governor actuated by centrifugal force, any variation of the speed of the motor thereby shifting the brushes on the commutator of the dynamo in return varying the current passing through the motor placed in the circuit of the dynamo.

FRANKLIN D. HARDY.

Witnesses:
W. C. CORLIES,
E. C. CRAWFORD.